June 5, 1934.  C. BRADLEY  1,961,841
ELECTRICAL SYSTEM
Filed Feb. 8, 1932
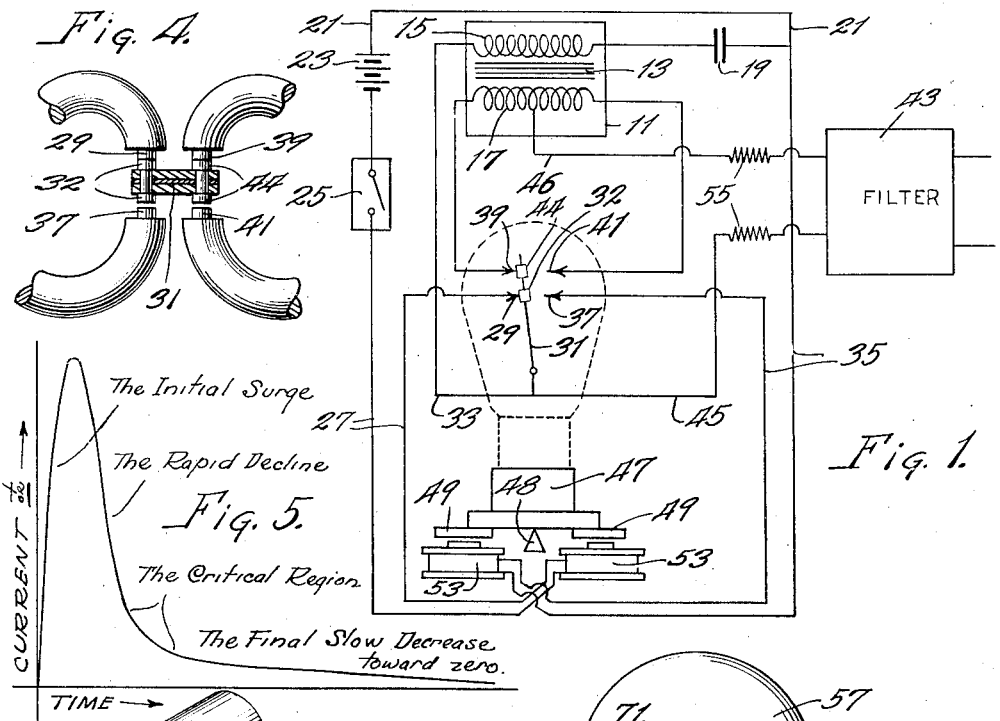
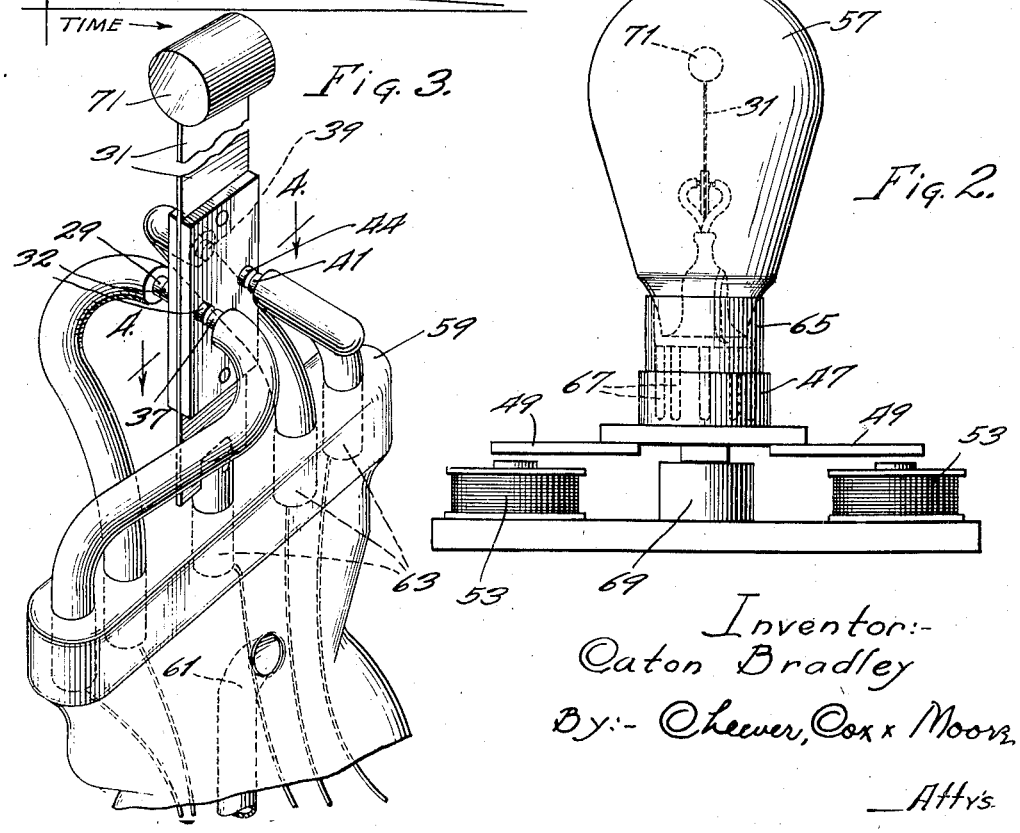
Inventor:-
Caton Bradley
By:- Cheever, Cox & Moore
Attys.

Patented June 5, 1934

1,961,841

UNITED STATES PATENT OFFICE 1,961,841

ELECTRICAL SYSTEM

Caton Bradley, Chicago, Ill.

Application February 8, 1932, Serial No. 591,742

13 Claims. (Cl. 171—97)

My invention relates in general to electrical systems for supplying high voltage electrical currents from a low voltage power source and has more particular reference to a means for and method of converting relatively low voltage direct current power, such as may be supplied by a storage battery, into high voltage power for various applications.

My invention further relates to the rectification of high voltage alternating current to provide high voltage direct current.

An important object of the invention is to provide a novel system and method for transforming relatively low potential direct current power into relatively high potential alternating current power of substantial sinusoidal wave form.

Another important object is to utilize a condenser operating in conjunction with a circuit changer and a source of direct current power to produce an alternating flow of current in the primary circuit without interrupting a heavy current in the circuit. This I accomplish by alternately charging and discharging the condenser through the primary winding using the circuit changer to interrupt the condenser charging and discharging circuits only when the current therein is at a minimum.

Another object is to utilize a mechanical rectifier in conjunction with the secondary winding of the transformer and timed to change the secondary circuit when the flow in the primary is at a minimum in order to accomplish sparkless rectification.

Another object is to accomplish sparkless rectification not only by interrupting the circuits under minimum current flow but also by enveloping the circuit changer electrodes in a vacuum or in an atmosphere comprising an inert gas.

Another important object is to utilize a rectifier in the system in conjunction with a source of relatively low voltage direct current power, a transformer, and a condenser or power storage means for producing a relatively high voltage alternating current.

Another important object is to provide, in conjunction with a system of the character described, a mechanical rectifier of novel construction and operation for converting the high voltage alternating current produced by the system into relatively high voltage direct current.

Among the numerous other important objects of the invention is to provide a novel circuit changer of the make and break type for use in conjunction with my rectifying and transforming system, which circuit changer is, of course, adapted for other uses; to utilize the surges of power travelling the system of my present invention for the purpose of actuating the circuit changer; to provide a single circuit changer for simultaneously controlling the primary and secondary circuits of a voltage transformer; to provide a circuit changer embodying a vibrating member; to provide a circuit changer including an oscillating member and contacts engaged by the oscillating member, the member and contacts being enclosed in a vacuum chamber to eliminate sparks; to provide a novel means for and method of rockingly supporting an enclosed oscillating device; to provide a circuit changer comprising an oscillating member and means to mechanically oscillate the member, said member having a natural period of vibration such that it will vibrate at a resonant frequency with respect to the frequency of the mechanical oscillating force.

Still another important object of the invention is to provide for the simplification of parts, the reduction of cost of construction, and, in general, the improvement in the means for and method of producing high voltage electrical power from low voltage power sources.

Numerous other objects and advantages of the invention will be apparent from the following description, which, taken in connection with the accompanying drawing, discloses a preferred embodiment of my invention.

Referring to the drawing:

Figure 1 is a wiring diagram illustrating an electrical transforming and rectifying system embodying my present invention;

Figure 2 is a perspective view illustrating a vacuum circuit changer of novel construction, which I prefer to use in connection with the transforming and rectifying system illustrated in Figure 1;

Figure 3 is a perspective view of the operating parts of the circuit changer illustrated in Figure 2;

Figure 4 is a horizontal section taken substantially along the line 4—4 in Figure 3, and Figure 5 is a current-time diagram.

To illustrate my invention, I have shown on the drawing in Figure 1, an electrical system including a transformer 11 comprising a core 13 carrying thereon the inductively associated primary winding 15 and the secondary winding 17. The primary winding 15 comprises relatively few turns and has relatively low resistance, while the secondary winding 17 has a relatively large number of turns and has relatively high resistance. The primary winding 15 also is connected to form a series circuit including the condenser 19, the conductor 21, the storage battery 23 forming a source of low voltage direct current power, the switch 25, the conductor 27 through the oscillating coil 53, and the make and break contact 29 and its co-operating shiftable contact 32 carried on the oscillatable and electrical conducting member 31 which is connected by means of the conductor 33 to the primary of the transformer. The primary winding of the transformer and the condenser 19 are also connected in a series circuit including the conductor 35 and the make and break contact 37, the shiftable member 31 of which is connected by means of the conductor 33 to the primary winding 15. By connecting the member 31 alternatively with the contact 29 and the contact 37, the condenser 19 may be alternatively charged from the storage battery through the transformer primary and discharged through the transformer primary and the short circuit conductors 35. This operation will cause a uni-directional flow of current through the primary winding 15 alternatively in opposite directions as the member 31 alternatively engages the contacts 29 and 37.

By properly selecting the resistance, capacitance, and reactance of the several elements incorporated in the circuit, the unidirectional current surges through the primary winding 15 may be caused to have a wave form substantially as illustrated in Figure 5 of the drawing, in which there is an initial surge during which the current flow rapidly reaches a maximum relatively high value. Immediately after the initial surge is completed, the amount of current flow decreases as rapidly as it increases during the initial surge. This rapid decline continues to a critical point after which the amount of current flowing decreases more slowly toward zero. The exact mathematical values of resistance, capacitance, and inductance necessary to provide surges having the desired wave form may be readily determined by those skilled in the art.

I find that, by using a condenser in this manner, sparking at the contacts 29 and 37 is entirely negligible because the circuit changer may be adjusted to operate only after the current in the circuit has reached a minimum. Of course, as soon as either the charging or discharging circuit is initially completed there will be a relatively heavy surging increase of current through the transformer winding but this will decrease toward zero as the condenser becomes fully charged or fully discharged as the case may be. The decrease in current, after the initial surge, is almost instantaneously rapid at first and then after a critical point is reached, the current decreases more slowly toward zero. The time interval involved, before the decreasing current reaches the critical point and thereafter more slowly approaches zero, is, of course, dependent upon the capacity of the condenser, and by adjusting the speed at which the circuit changer operates, it is possible to interrupt either the charging or discharging circuit at any desired time interval after the initial current surge has subsided, that is to say, after the critical point is reached and the current in the circuit is a very small quantity that is constantly though relatively dwindling toward zero. This is illustrated in the diagram shown in Figure 5, which shows a type curve of the current-time relationship in the winding 15 after the circuit changer operates either to charge or discharge the condenser.

Sparking at the contacts of the circuit changer is also guarded against by enclosing the circuit changer in an evacuated or inert gas filled envelope and by providing for operating the circuit changer in its envelope in a novel manner, which I shall hereinafter more fully describe in connection with a preferred form of rectifier, which I provide for use in conjunction with the secondary winding to produce direct current at high efficiency.

The alternating current surges set up in the primary winding 15 induce corresponding alterations of current in the secondary winding 17. The induced current is of relatively high potential because of the high ratio between the turns of the secondary and the turns of the primary windings. The high voltage alternating current thus generated may be taken directly from the terminals of the secondary winding and applied in any desirable fashion and it is within the contemplation of my present invention to use the high voltage alternating current directly and without rectifying it. However, for my purpose, it is desirable to obtain high voltage direct current and to this end I provide means for rectifying the high voltage current induced in the secondary winding.

This is accomplished by connecting the secondary winding of the transformer to a rectifier, which, of course, may be of any suitable form or construction. I prefer, however, to employ a mechanical rectifier including at least one, and preferably two, make and break contacts 39 and 41. By using only one contact 39, the rectifier will provide what is known as half wave rectification while if two contacts are employed full rectification may be accomplished.

For half wave rectification, the contact 39 is connected to one side of the secondary winding 17, the other side of the transformer secondary being connected directly to the output 43 of the system, which, in the illustrated embodiment, is shown as a filter, and the movable element 31 carries the shiftable contact 44 of the make and break device and is connected directly to the filter through the conductor 45.

Where full wave rectification is desired, one side of the secondary winding is connected to the contact 39, the other side of the winding being connected to the contact 41, as shown in Figure 1, and the secondary is provided with a center tap 46, which is connected to the output 43, the shifting contact 44 being also connected directly to the output as in the half wave rectification. I may, of course, employ separate members to carry each of the shifting contacts 32 and 44, that is to say, a shifting element 31 may be provided for the contacts 29 and 37, a separate shifting element being provided for the corresponding contacts 39 and 41. If this construction is employed, however, it is necessary to adjust the shifting members to vibrate in synchronism to effect simultaneous contact with the contacts 29 and 39, and alternately with contacts 37 and 41. I prefer, however, to employ a single shifting member since this will ensure the simultaneous engagement of the contacts 29, 39, and 37, 41.

The reed 31 may carry insulated contacts 32 and 44 and separate insulated outlet conductors are provided to connect the contact 32 with the conductor 33 and the contact 44 with the conductor 45, but I prefer to form the reed of some suitable conducting material and mount the vibrating contacts therein without insulation since only one outlet connection is then needed to attach both contacts in an external circuit, the reed itself forming a part of both the primary circuit and of the secondary circuit.

The device is operated by closing the control switch 25 and vibrating the member 31 between the position engaging the contacts 29, 39, and the position engaging the contacts 37, 41. When the contact 32 engages the contact 39 direct current will flow through the primary winding 15 in one direction and charge the condenser 19. At the same instant a corresponding surge of current will take place through the transformer secondary winding in one direction and will pass by way of the contacts 39, 44, and the member 31 to the output. When the contact 32 releases the contacts 29, 39, and engages the contact 37, the condenser 19 will discharge through the circuit including the condensers 35 and current will thus be caused to flow through the transformer winding in a direction opposite to that set up therein when the contact 32 engages the contact 29.

If the device is connected for half wave rectification, the contact 41 will be inoperative during the discharge of the condenser through the primary winding 15, since the end of the secondary, which, in Figure 1, is shown connected with the contact 41, is, for half wave operation, connected directly to the filter and the secondary circuit will consequently be open at the contact 39 during the condenser discharge so that no flow of current will be passed to the output.

Where the device is arranged for full wave operation, as shown in the drawing, the current introduced in the secondary circuit during the discharge of the condenser 19, will be passed to the output through the contacts 41, 44, and the member 31, and will have the same polarity with respect to the output as the flow passed thereto through the contact 39. The current, flowing into the filter thus is uni-directional whether the device is arranged for half or full wave operation.

The member 31 may be oscillated between the co-operating contacts in any convenient manner but I prefer to accomplish this by forming the member 31 as a flexible reed of any suitable conducting material and to mount same together with its co-operating stationary contacts in a suitable base or holder 47, which is supported for vibratory movement about a fulcrum 49. Means is provided for vibrating the support 47 about its fulcrum in order to cause the member 31 and the moving contacts carried thereby to vibrate between and alternately engage the stationary contacts in order to make and break the primary and secondary circuits as heretofore described and for this purpose, I prefer to employ the surges of current in the condenser charging and discharging circuits. To this end, the base 47 is preferably provided with a pair of armatures 51 on opposite sides of the fulcrum 49. Immediately beneath the armatures 51, the electromagnets 53, one of which is connected to the charging circuit and the other of which is connected in the discharging circuit 35, are arranged so that when the charging circuit 27 is in operation through the engagement of the contact 29 with the vibrating member 31, one of the electromagnets 53 will operate to jar the support 47 in one direction about its fulcrum and immediately thereafter when the discharging circuit 35 is in operation, the electromagnets 53 will operate to jolt the base 47 in the opposite direction about its support.

The electromagnets 53 also exert a choking effect upon the current flowing through the circuits 27 and 35 and therefore tend to make the wave form of the current surges, flowing through the primary, approach sinusoidal characteristics so that the alternating current induced in the secondary will have substantially a sinusoidal wave form.

I also find it desirable, though not essential, to utilize reactance coils 55 in the output leads to create a choking effect in order to reduce the peak voltages in the current delivered to the output whereby to eliminate fluctuations in the direct current delivered to the filter.

The contacts and vibrating member 31 may, of course, be made and mounted in any suitable or convenient manner but I prefer to mount them with n an evacuated or inert gas filled chamber, which is formed preferably as a glass evacuated or inert gas filled envelope 57, containing a preferably glass base 59, on which the member 31 and its co-operating contacts are mounted substantially as shown in Figure 3 of the drawing. The envelope 57 and the support also provide sealed outlets 63 whereby the vibrating member 31 and its co-operating contacts may be connected in external electrical circuits.

The particular structure of the enclosed circuit changer, shown in Figures 2, 3, and 4, is especially well adapted for use in connection with the transforming and rectifying system illustrated in Figure 1. However, the circuit changer, enclosed as it is in an exhausted or gas filled envelope, is useful for other purposes.

The envelope 57 and its contents are adapted to be mounted in any suitable form of base 65, but I prefer to use the common form which I have illustrated and which comprises the UX type well known in radio art. For my present purpose, the base contains five prongs, one of which is electrically connected with the vibrating member 31 and each of the other prongs 67 is connected to one of the other contacts 29, 39, 37, 41. The support receptacle 47 is also provided with sockets to receive the prongs by which the circuit breaker may be connected to the external circuits. The receptacle 47 is also preferably mounted for restricted vibratory movement on a support 69, which preferably has a certain resilience to permit the base to vibrate slightly under the influence of the magnets 53. The oscillating member 31 also is preferably adjusted as to its natural period of oscillation in order that it may be caused to vibrate vigorously at a resonant frequency such as to make and break the condenser charging and discharging circuits at the proper time when the current surge has subsided to a desired extent.

In the device of my present invention, it is possible to utilize a very slight vibratory displacement of the base 65 in order to cause the member 31 to vibrate vigorously in order to alternately make and break the circuits at the contacts 29, 39, 37, and 41.

I also prefer to form the member 31 with a slight bias toward the contacts 29 and 39 as shown clearly in Figure 4 of the drawing, so that when at rest the condenser circuit will be completed through the contact 29 so that when the switch 25 is closed the system will automatically be set in operation.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages; the form herein described being a preferred embodiment for the purpose of illustrating my invention.

Having thus described my invention, what I claim as new and desire to secure by Letters Patent is as follows:

1. In combination with a primary winding, means including a condenser, means alternatively charging and discharging the condenser through said winding, a secondary winding inductively coupled with said primary winding, and a rectifier associated with the secondary winding for converting the alternating current induced therein to direct current.

2. A source of direct current power, a primary winding, means including a condenser and means to charge the condenser from the source of direct current power through said primary winding, means to discharge the condenser through said winding, and a rectifier associated with the secondary winding of the transformer.

3. In combination with a source of direct current power, a primary winding, a condenser, means including a circuit changer for alternatively charging and discharging the condenser through said primary winding, a secondary winding inductively associated with said primary winding, and means including a second circuit changer moving in synchronism with the first circuit changer for rectifying the current induced in the secondary winding.

4. In combination with a source of direct current power, a primary winding, a condenser, means including a circuit changer for alternatively charging and discharging the condenser through said primary winding in order to produce alternating current fluctuations therein, and a secondary winding inductively associated with said primary winding.

5. In combination with a source of direct current power, a primary winding, a condenser, means including a circuit changer for alternatively charging and discharging the condenser through said primary winding and a secondary winding inductively associated with said primary winding, said circuit changer comprising a contact and a shifting member alternatively engaging and disengaging said contact.

6. In combination with a source of direct current power, a primary winding, a condenser, means including a circuit changer for alternatively charging and discharging said primary winding and a secondary winding inductively associated with said primary winding, said circuit changer comprising a contact and a shifting member alternatively engaging and disengaging said contact, and means to enclose the contact and the shifting member in a vacuum.

7. In combination with a source of direct current power, a primary winding, a condenser, means including a circuit changer for alternatively charging and discharging said primary winding and a secondary winding inductively associated with said primary winding, said circuit changer comprising a contact and a shifting member alternatively engaging and disengaging said contact, said contact and said shifting member being mounted on a supporting base and means to oscillate the supporting base to cause the shifting member to alternatively engage and release said contact.

8. In combination with a source of direct current power, a primary winding, a condenser, means including a circuit changer for alternatively charging and discharging said primary winding and a secondary winding inductively associated with said primary winding, said circuit changer comprising a contact and a shifting member alternatively engaging and disengaging said contact, said contact and said shifting member being mounted on a supporting base and means actuated by the flow of condenser charging and discharging currents through said primary winding for oscillating said supporting base.

9. In an electrical system, a circuit including a source of direct current power, a primary winding and a condenser, a second circuit including the primary winding and the condenser, and excluding the power source, and a circuit changing means to alternately complete said circuits, a secondary winding inductively coupled with the first mentioned winding, and a rectifier associated with said winding.

10. In combination, a primary winding, a second winding inductively coupled with the primary winding, a condenser in series in the primary winding, means including a charging circuit to force a uni-directional current through the primary winding, and means including a condenser discharging circuit for changing the direction of current flowing through said primary winding whereby to alternately charge and discharge the condenser through said primary winding, and inductive reactance means in the charging and discharging circuits.

11. In combination with a primary winding, means including a condenser, means alternatively charging and discharging the condenser through said winding, a secondary winding inductively coupled with said primary winding, and reactance means through which the condenser charging and discharging currents flow.

12. In an electrical system, a circuit including a source of direct current power, a primary winding and a condenser, a second circuit including the primary winding and the condenser while excluding the power source, a circuit changing means to alternately complete said circuits, and a secondary winding inductively coupled with the first mentioned winding.

13. The combination with a primary winding and a condenser, of means including a circuit changer for automatically charging and discharging the condenser through the primary winding, a secondary winding inductively associated with the primary winding, said circuit changer comprising a contact and a shifting member adapted to alternatively engage and disengage said contact, said shifting member being carried on a base and means actuated by the alternate flow of charging and discharging current to oscillate said supporting base.

CATON BRADLEY.